United States Patent
Cocchi et al.

(10) Patent No.: US 9,289,006 B2
(45) Date of Patent: Mar. 22, 2016

(54) MACHINE AND METHOD FOR THE THERMAL TREATMENT OF LIQUID AND SEMI-LIQUID FOOD PRODUCTS

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.p.A.—CARPIGIANI GROUP (IT)

( * ) Notice: Subject to any disclaimer, the term of this patent is extended or adjusted under 35 U.S.C. 154(b) by 0 days.

(21) Appl. No.: 14/158,417

(22) Filed: Jan. 17, 2014

(65) Prior Publication Data

US 2014/0212559 A1   Jul. 31, 2014

(30) Foreign Application Priority Data

Jan. 29, 2013  (IT) ............................... BO2013A0037

(51) Int. Cl.
  *A23C 3/02* (2006.01)
  *A23G 9/22* (2006.01)
  *A23L 3/005* (2006.01)
  *A23G 9/30* (2006.01)

(52) U.S. Cl.
  CPC .............. *A23G 9/224* (2013.01); *A23G 9/305* (2013.01); *A23L 3/005* (2013.01)

(58) Field of Classification Search
  CPC ............................. A23G 9/224; A23G 9/305
  USPC ................... 426/522, 521, 524; 99/453, 455; 62/278, 222, 521, 524, 352, 306, 342, 62/348, 498, 162, 185, 62
  See application file for complete search history.

(56) References Cited

U.S. PATENT DOCUMENTS

| | | | |
|---|---|---|---|
| 3,724,235 A * | 4/1973 | Carpigiani | 165/61 |
| 3,811,494 A * | 5/1974 | Menzel | 165/65 |
| 4,476,146 A | 10/1984 | Manfroni | |
| 4,607,494 A * | 8/1986 | Cipelletti | 62/62 |
| 2009/0193828 A1* | 8/2009 | Cocchi et al. | 62/222 |
| 2011/0088869 A1 | 4/2011 | Wadle et al. | |

FOREIGN PATENT DOCUMENTS

| | | |
|---|---|---|
| EP | 2446749 | 5/2012 |
| IT | 1145915 | 11/1986 |

OTHER PUBLICATIONS

Italian Search Report dated Nov. 27, 2013 from counterpart App No. BO20130037.

\* cited by examiner

*Primary Examiner* — Phuong Nguyen
(74) *Attorney, Agent, or Firm* — Timothy J. Klima; Shuttleworth & Ingersoll, PLC

(57) ABSTRACT

A machine for the homogenization and thermal treatment of liquid and semi-liquid food products includes a tank for containing the food products; an electric first heater, operating on the food product to heat it and so thermally treat it; a heating plant with a thermodynamic cycle including at least a first heat exchanger; and a second heater including the first heat exchanger, operating on the food product to heat it and so thermally treat it.

18 Claims, 3 Drawing Sheets

MACHINE AND METHOD FOR THE THERMAL TREATMENT OF LIQUID AND SEMI-LIQUID FOOD PRODUCTS

This application claims priority to Italian Patent Application BO2013A000037 filed Jan. 29, 2013, the entirety of which is incorporated by reference herein.

BACKGROUND OF THE INVENTION

This invention relates to a machine and a method for the thermal treatment of liquid and semi-liquid food products, in particular, but without limiting the invention, for the thermal treatment (pasteurization) of products of the ice cream trade.

Thermal treatment machines of known type comprise a tank for containing the product to be subjected to the pasteurization treatment. Inside the tank there is a stirrer.

The containment tank is heated by a plurality of electrical heating elements to bring the product to the required treatment temperature.

One need felt by operators in the trade is the need to obtain a product of consistently high quality even when product composition or temperature is varied.

In particular, in machines of this kind, it is not uncommon for parts of the product nearest the walls of the tank to be burnt on account of non-optimal product heating.

Indeed, it is extremely difficult to control the local temperature of the heating elements to prevent the formation of hot spots.

Burning occurs locally mainly at the parts of the tank where the electrical heating elements are located and alters the organoleptic properties and hence the quality of the end product.

It is also known that the viscosity of the product tends to change as a function of temperature: thus, non-optimal product heating leads to incorrect or unwanted viscosity which in turn means that prior art pasteurizing machines may suffer from problems of insufficient stirring or, on the contrary, excessive fluidity resulting in the product spurting or splashing out of the tank.

SUMMARY OF THE INVENTION

The aim of this invention is to provide a pasteurizing machine and method to overcome the above mentioned problems and to meet the above mentioned need.

Another aim of the invention is to provide a pasteurizing machine and method where product heating is optimal.

Yet another aim of the invention is to provide a pasteurizing machine and method where the treated product is of optimal quality.

The above aims are achieved by the machine and method according to the invention for pasteurizing liquid and semi-liquid products.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a non-limiting example embodiment of the invention and in which:

DESCRIPTION OF THE PREFERRED EMBODIMENTS

Figure 1:
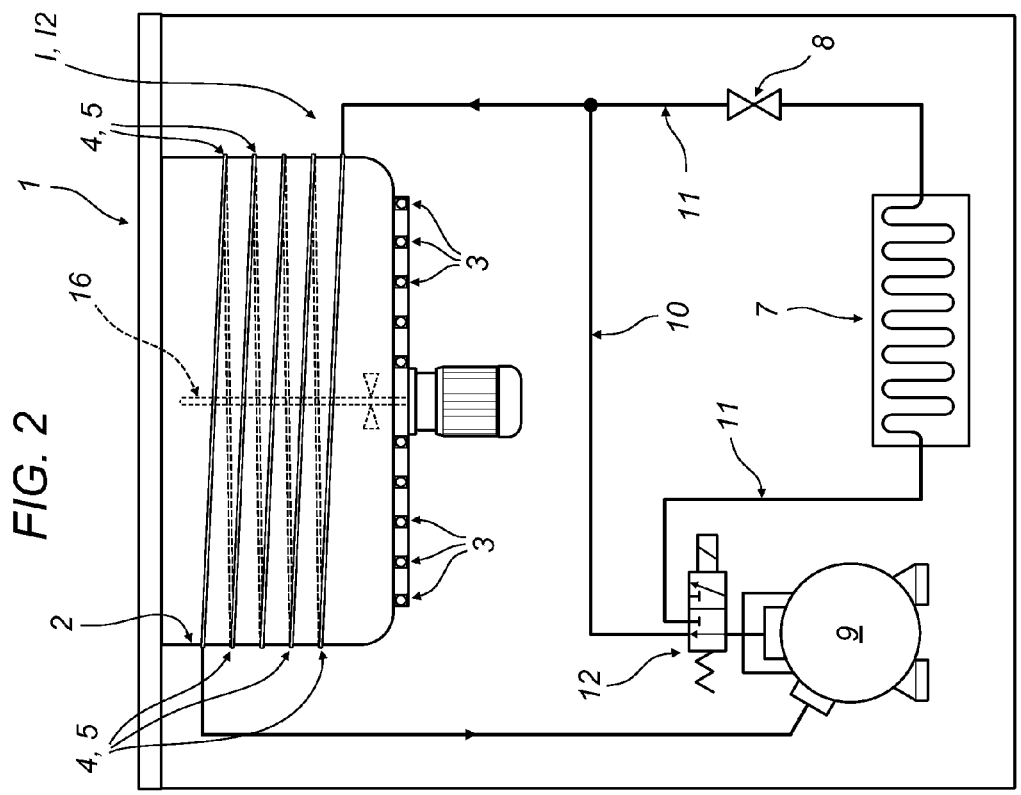
FIGS. 1 to 6 illustrate respective variant embodiments of a machine for the homogenization and thermal treatment of liquid and semi-liquid products which is the object of this invention.

According to the invention, the numeral 1 denotes a machine for the homogenization and thermal treatment of liquid and semi-liquid food products such as, for example, ice creams, whipped cream, creams, chocolate, yogurt and the like.

FIGS. 1 to 6 illustrate six embodiments of the machine 1 according to this invention.

These embodiments are described in more detail below.

The machine 1 for the homogenization and thermal treatment of liquid and semi-liquid food products comprises, in combination:

a tank 2 for containing the food products;

electric first heating means 3, operating on the food product to heat it and so thermally treat it;

a heating plant I with thermodynamic cycle comprising at least a first heat exchanger 5;

second heating means 4 comprising the first heat exchanger 5, operating on the food product to heat it and so thermally treat it.

The term "heat exchanger" or simply "exchange" is used to mean a heat exchanger configured to allow exchanging thermal power with the operating fluid of the plant.

The machine 1 is preferably a machine for pasteurizing and/or homogenizing liquid or semi-liquid products.

Below is a description of the different embodiments of the machine according to the invention, illustrated in FIGS. 1-6.

It should be noted, advantageously, that according to the invention the first heating means 3 and the second heating means 4 may be activated simultaneously so as to allow combined heating of the product in the tank 2, as explained below.

FIG. 1 shows a first embodiment of the machine according to the invention.

In this embodiment, the electric first heating means 3 and the second heating means 4 operate on the tank 2 to heat the product contained therein.

More specifically, the electric first heating means 3 are positioned in such a way that they transmit heat to the food products through the bottom walls of the tank 2.

The second heating means 4, on the other hand, are positioned in such a way that they transmit heat to the food products through the lateral walls of the tank 2.

It should be noted, therefore, that more generally speaking the electric first heating means 3 and the second heating means 4 are positioned in such a way that they transmit heat to the food product through the walls of the tank 2.

The first heating means 3 are preferably built into a heating plate.

The heating plate is in contact with the bottom of the tank 2.

It should be noted that the second heating means 4 are wound around the lateral walls of the tank 2, defining a coil.

In the embodiment illustrated in FIG. 1, the heating plant I with thermodynamic cycle comprises a heating plant I1 with a heat pump, where the first exchanger 5 cools the operating fluid of the thermodynamic cycle (preferably by condensation) thereby cooling the product in the tank 2.

It should be noted that the heating plant I1 comprises the first exchanger 5, a compressor 9, throttle means 8 (preferably a throttle valve 8) and a second exchanger 7.

It should also be noted that the machine 1 is equipped with a stirrer 6 which mixes the product inside the tank 2.

The stirrer 16 comprises a rotary shaft, a motor configured to drive the shaft in rotation and a blade attached to the rotary shaft and shaped in such a way as to allow stirring the product in the tank 2.

The second exchanger 7 is used to heat the operating fluid.

Figure 2:
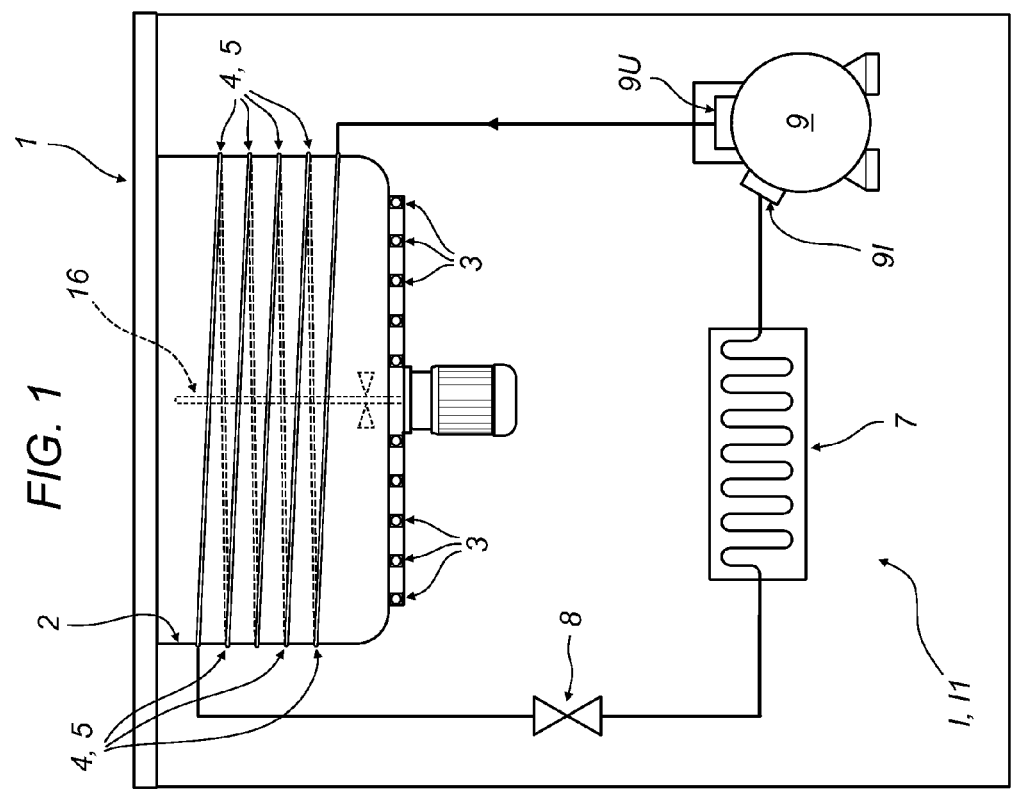

FIG. 2 illustrates a variant embodiment of the machine of FIG. 1

More specifically, in this embodiment, the arrangement of the first heating means 3 and of the second heating means 4 is substantially the same as in the embodiment illustrated in FIG. 1.

The heating plant I2 is equipped with a circuit in which the operating fluid is made to circulate.

The circuit comprises the first exchanger 5, a second exchanger 7, throttle means 8 for the operating fluid and compression means 9 for the operating fluid.

The circuit also comprises a by-pass branch 10 which can be connected to the compression means 9 for allowing the operating fluid to circulate in the compression means 9 and in the first exchanger 5 while preventing the fluid from circulating in the second exchanger 7 and in the throttle means 8.

In this embodiment, the machine 1 also comprises switching means 12, which can be activated to connect the bypass branch 10 to the compression means 9 and consequently to prevent the operating fluid from circulating in the second exchanger 7 and in the throttle means 8.

In other words, the by-pass branch is connected to the compression means 9 so that the operating fluid can circulate in the part of the circuit where the second heating means 4 and the compressor 9 are located.

That way, the operating fluid is heated at the compressor, where heat is generated by the very effect of its operation (heat generated by friction between the parts of the compressor 9 and by the Joule effect of the current in the windings of the electric motor of the compressor 9 itself) and transfers heat to the product in the tank 2 through the first exchanger 5.

To sum up, therefore, the operating fluid is made to circulate between the first exchanger 5 and the compressor 9 in order to heat the operating fluid at the compressor 9 and to transfer heat to the product being processed at the first exchanger 5.

It should be noted that when the by-pass branch is not connected to the circuit, the first heat exchanger 5 acts substantially as a cooler for the product in the tank 2.

In effect, the first heat exchanger 5 is located upstream of the compressor, thus constituting an evaporator, that is, an exchanger which absorbs heat in such a way as to heat the operating fluid and cool the product in the tank 2.

Thus, after the heating cycle, the product in the tank 2 can advantageously be cooled to a temperature suitable for storing the product.

It should also be noted that the heating plant I2 may be of the type described in prior Italian patent IT1145915, which is incorporated herein by reference.

It is expressly understood that all the functional and structural features of the heating plant of the prior Italian patent IT1145915 can be applied to the machine 1 in this embodiment of it.

The applicant thus seeks protection for a machine 1 having the features of the independent claim and a heating plant as described in prior Italian patent IT1145915.

Figure 5:
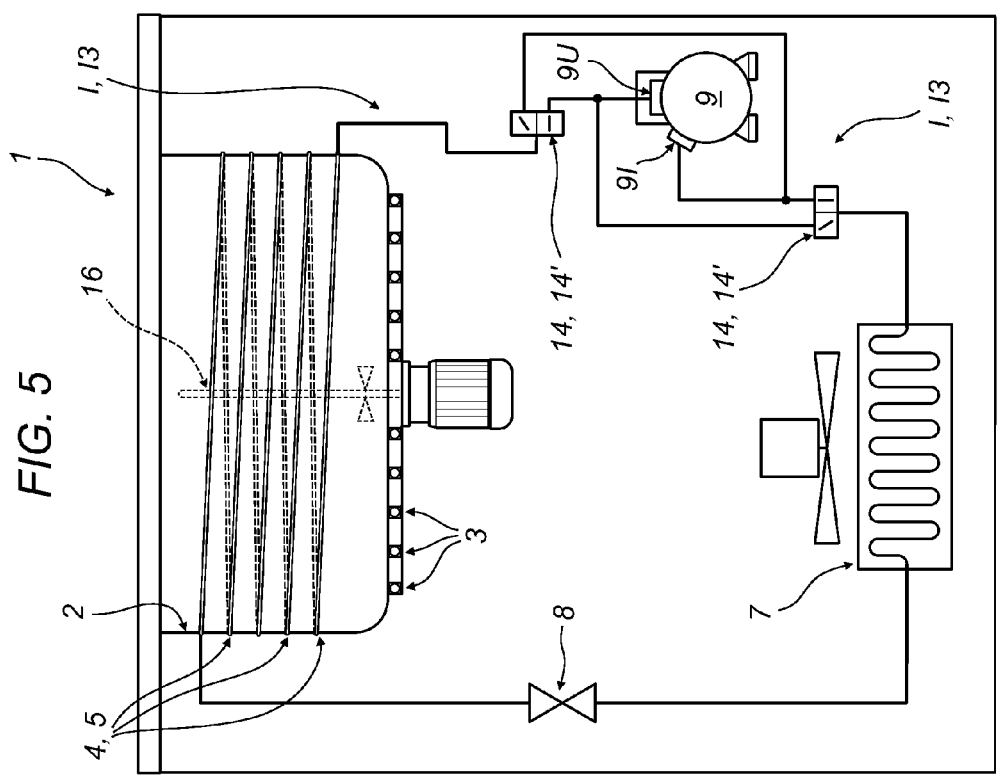

Yet another variant embodiment of the machine of FIGS. 1 and 2 is illustrated in FIG. 5.

More specifically, in this embodiment, the arrangement of the first heating means 3 and of the second heating means 4 is substantially the same as in the embodiment illustrated in FIGS. 1 and 2.

In this embodiment, the heating plant with thermodynamic cycle is a heating plant I3 with an invertible thermodynamic cycle.

Preferably, the heating plant I3 with an invertible thermodynamic cycle uses carbon dioxide as refrigerant.

Advantageously, use of carbon dioxide, whose critical temperature is around 31° C., means that heat transfer in the first exchanger 5 (or in the second exchanger 7 when operation is inverted) does not involve condensation of the carbon dioxide but only its cooling.

Thus, according to this aspect, the thermodynamic cycle is a transcritical cycle.

More specifically, according to the embodiment illustrated the machine 1 comprises means (14) for switching the cycle of the plant I3.

It should be noted that the switching means 14 are preferably configured to connect alternately:
  i) one of the two outputs of the first exchanger 5 to the output 9U of the compressor and one of the two outputs of the second exchanger 7 to the input 9I of the compressor (as illustrated in FIG. 5), so as to obtain a first operating mode of the plant I3;
  ii) one of the two outputs of the first exchanger 5 to the input 9I of the compressor and one of the two outputs of the second exchanger 7 to the output 9U of the compressor (configuration not illustrated), so as to obtain a second operating mode of the plant I3.

Thus, the switching means 14 comprise first switching means 14' and second switching means 14" configured to allow obtaining the two above mentioned alternative configurations i) and ii).

More specifically, it should be noted that in the first operating mode, the plant I3 operates substantially as a heat pump: the first exchanger 5 transfers heat to the product being processed in the tank 2, while the second exchanger 7 absorbs heat from the outside.

In the second operating mode ii) of the plant, on the other hand, the first exchanger 5 absorbs heat from the product, thereby cooling it.

In the second operating mode ii) of the plant, therefore, the heating means 4 do not heat the product and the first exchanger 5 constitutes means for cooling the product.

Thus, it should be noted that, in the embodiment illustrated, the operation of the plant I3 is, in practice, inverted: in the first operating mode i), the plant I3 substantially operates with the first exchanger 5 in heat pump mode to heat the product in the tank 2; in the second operating mode the plant 3 substantially operates with the first exchanger 5 in cooling cycle mode to cool the product in the tank 2.

It should be noted that, advantageously, after completing the thermal treatment on the product with the first heating means 3 and with the second heating means 4, the aching 1 allows the product to be cooled.

Figure 3:
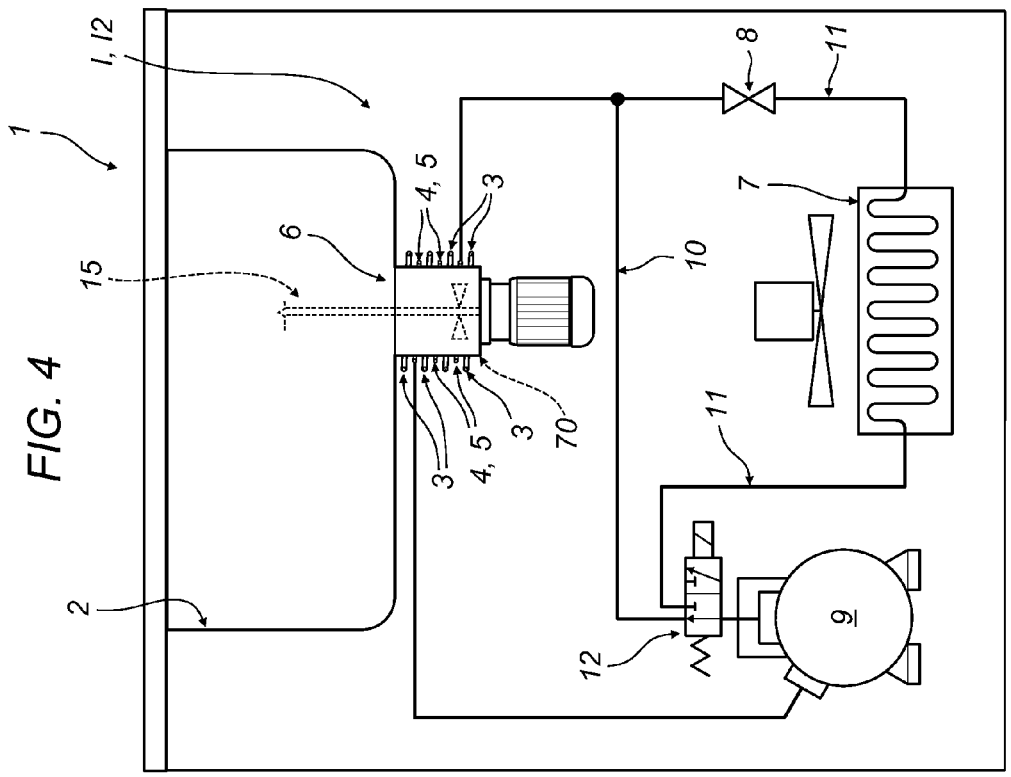

FIG. 3 shows another embodiment of the machine according to the invention.

It should be noted that this machine comprises the same plant I1 as described with reference to the embodiment of FIG. 1, to which the reader is referred for further details.

This machine comprises a well 6 located at the bottom of the tank 2 and configured to receive part of the liquid and semi-liquid products.

It should be noted that the well 6 preferably has the shape of a cylinder.

The well 6 defines an internal cavity which is in fluid communication with the tank 2 in order to receive a part of the product into it.

The internal cavity thus defines a compartment for receiving a part of the product.

The machine 1 also comprises an impeller 15 mounted rotatably on the well 6.

The impeller 15 is connected to respective drive means, such as, for example, an electric motor.

It should be noted that the machine comprises pumping means 70 defined by the selfsame well 6 and by the impeller 15 mounted rotatably on the well 6 to generate the pressure head needed to circulate the product.

More specifically, the opening of the well 6 giving onto the bottom of the tank 2 defines the intake of the pumping means 70, while an opening in the lateral walls of the well 6 defines a delivery section (in communication with the tank 2 to allow the product to circulate).

The pumping means 70 define what is known as a vessel pump (that is, a centrifugal pump).

The vessel pump 70 is also described in prior patent document EP2446749A1, which is incorporated herein by reference: it is understood, therefore that the vessel pump (denoted by the reference numeral 3) described in document EP2446749A1, and more specifically also all the features relating to communication of the vessel pump with the tank 2 and to the structure of the vessel pump and of the respective drive means (impeller, driving magnet and driven magnet) can be applied to the machine 1 of this invention and must therefore be deemed to be incorporated by reference in this patent application, by which the applicant seeks protection for this specific combination of a machine according to claim 1 with the vessel pump as in prior patent document EP2446749A1.

It should be noted, therefore, that the vessel pump 70 is connected to the bottom of the tank.

In this embodiment, the electric first heating means 3 and the second heating means 4 are positioned in such a way that they transmit heat at the well 6.

More specifically, the electric first heating means 3 and the second heating means 4 are positioned in such a way that they transmit heat through the walls (preferably the lateral walls) of the well 6.

Preferably, the electric first heating means 3 and the second heating means 4 are positioned on the outside of the well 6 in such a way as to transmit heat to the product through the lateral walls of the well 6.

More specifically, it should be noted that the first heating means 3 preferably comprise at least one heating element coiled around the well 6 to define a plurality of coils.

It should also be noted that the first exchanger 5 defines a plurality of coils wound around the well 6.

It should be noted that, preferably, the coils of the first exchanger 5 and those of the well 6 are wound alternately around the well: in other words, a coil of the first exchanger 5 is followed, in a vertical direction, by a coil of the first heating means 3 and vice versa.

Figure 4:
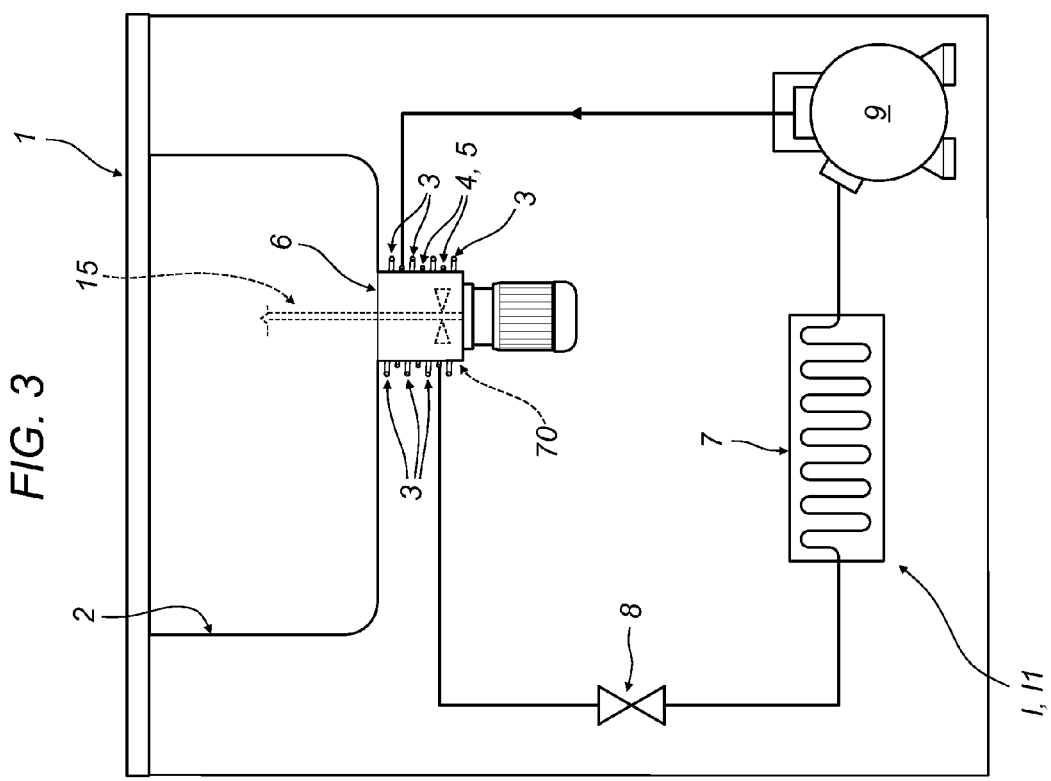

FIG. 4 illustrates yet another variant embodiment of the machine according to the invention.

More specifically, in this embodiment, the arrangement of the first heating means 3 and of the second heating means 4 is substantially the same as in the embodiment illustrated in FIG. 3, described above.

The heating plant I with thermodynamic cycle, on the other hand, comprises the heating plant I2 described with reference to the embodiment of FIG. 2, to which the reader is referred for further details.

Figure 6:
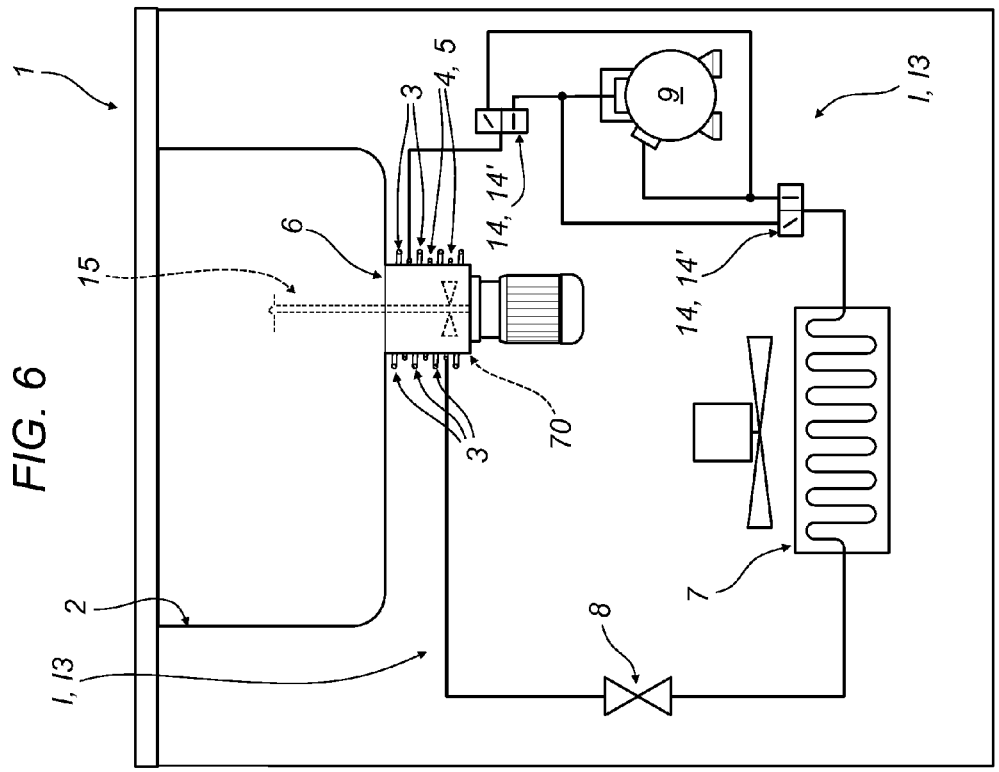

FIG. 6 illustrates yet another variant embodiment of the machine according to the invention.

More specifically, in the embodiment of FIG. 6, the arrangement of the first heating means 3 and of the second heating means 4 is substantially the same as in the embodiment illustrated in FIG. 3.

The heating plant I with thermodynamic cycle of this embodiment, on the other hand, comprises the heating plant I3 described with reference to the embodiment of FIG. 5, to which the reader is referred for further details.

It should be noted that the machine 1 according to the invention, in particular according to any of the variant embodiments described above, advantageously allows the product in the tank to be heated in a particularly efficient, uniform and gradual manner, without any risks of hot spots and local burning of the product.

The machine 1 thus makes it possible to obtain an optimum end product of particularly high quality.

It should be noted that the invention also defines a method for the homogenization and thermal treatment of liquid and semi-liquid food products such as, for example, ice creams, whipped cream, creams, chocolate, yogurt and the like, comprising, in combination, the following steps:

putting the food products in a containment tank 2;

heating the food products put in the tank by generating heat with electric first heating means 3;

heating the food products put in the tank 2 by means of heat exchange with an operating fluid of a heating plant (I1, I2, I3) with thermodynamic cycle.

Preferably, the steps of heating the food products inside the tank 2 by generating heat with electric first heating means 3 and heating the food products inside the tank 2 by heat exchange with an operating fluid of a heating plant (I1, I2, I3) with thermodynamic cycle are performed substantially simultaneously.

According to this aspect, the first and second heating means operate in combination to heat the product inside the tank more gradually.

Advantageously, this type of heating is comparable, in terms of advantageous effects, with heating in a water bath but without the disadvantage of thermal inertia associated with heating in a water bath.

What is claimed is:

1. A machine for the homogenization and thermal treatment of at least one chosen from a liquid and a semi-liquid food product, comprising:

a tank for containing the food product, the tank including at least one lateral wall and a bottom wall together forming a main volume of the tank;

an electric first heater, operating to heat and so thermally treat the food product;

a heating plant with a thermodynamic cycle comprising a circuit including at least a first heat exchanger and an operating fluid for circulating in the circuit;

a second heater comprising said first heat exchanger, operating to heat and so thermally treat the food product by operation of the operating fluid circulating in the circuit;

the tank including a well, the well positioned on the bottom wall of the tank, the well directly open and contiguous to the main volume of the tank via an opening in the bottom wall to form with the main volume a continuous containment volume in which the food product can freely circulate between the main volume and the well for storing and working the food product;

a pump for circulating the food product between the well and the main volume, the pump including an impeller rotatably positioned in the well and open to the main volume and a motor for rotating the impeller to circulate the food product between the well and the main volume;

wherein the electric first heater and the second heater are positioned to transmit heat at the well.

2. The machine according to claim 1, wherein the electric first heater is positioned to transmit heat to the food product through the bottom wall of the tank.

3. The machine according to claim 1, wherein the second heater is positioned to transmit heat to the food product through the at least one lateral wall of the tank.

4. The machine according to claim 1, wherein the electric first heater and the second heater are positioned to transmit heat to the food product at the tank.

5. The machine according to claim 4, wherein the electric first heater and the second heater are positioned to transmit heat to the food product through at least one chosen from the at least one lateral wall and the bottom wall of the tank.

6. The machine according to claim 1, wherein the electric first heater and the second heater are positioned to transmit heat through at least one wall of the well.

7. The machine according to claim 1, wherein the heating plant with thermodynamic cycle comprises a heating plant with a heat pump, where the operating fluid of the thermodynamic cycle is cooled in the first heat exchanger.

8. The machine according to claim 1, wherein the heating plant with thermodynamic cycle comprises a heating plant with invertible cycle.

9. The machine according to claim 1, wherein the circuit includes a second heat exchanger, a throttle for the operating fluid, a compressor for the operating fluid, and a by-pass branch, which is connected to the compressor for allowing a circulation of the operating fluid in the compressor and in the first heat exchanger and, in contrast, excluding circulation of the operating fluid in the second heat exchanger and the throttle.

10. The machine according to claim 9, comprising a switching valve, which is activated for connecting the by-pass branch to the compressor and consequently for excluding the circulation of the operating fluid in the second heat exchanger and the throttle.

11. The machine according to claim 1, wherein the operating fluid includes carbon dioxide.

12. The machine according to claim 1, wherein the first heat exchanger of the second heater and the first heater are interleaved with one another around an outer surface of the well.

13. The machine according to claim 12, wherein a clearance is provided between the impeller and the well such that the rotating impeller causes fluid to flow in one direction between the main volume and the well through a central portion of the opening and in an opposite direction between the main volume and the well through an outer portion of the same opening.

14. The machine according to claim 13, wherein the opening is a sole connection between the well and the main volume.

15. The machine according to claim 12, wherein the opening is a sole connection between the well and the main volume.

16. The machine according to claim 1, wherein a clearance is provided between the impeller and the well such that the rotating impeller causes fluid to flow in one direction between the main volume and the well through a central portion of the opening and in an opposite direction between the main volume and the well through an outer portion of the same opening.

17. The machine according to claim 16, wherein the opening is a sole connection between the well and the main volume.

18. The machine according to claim 1, wherein the opening is a sole connection between the well and the main volume.

* * * * *